United States Patent
Tovey

(10) Patent No.: US 6,643,673 B1
(45) Date of Patent: Nov. 4, 2003

(54) METHOD AND APPARATUS FOR ARITHMETIC SHIFTING

(75) Inventor: DeForest Tovey, Los Gatos, CA (US)

(73) Assignee: ATI International, SRL, Barbados (KN)

(*) Notice: Subject to any disclaimer, the term of this patent is extended or adjusted under 35 U.S.C. 154(b) by 0 days.

(21) Appl. No.: 09/451,638

(22) Filed: Nov. 30, 1999

(51) Int. Cl.[7] .................................................. G06F 7/00
(52) U.S. Cl. ..................................................... 708/209
(58) Field of Search ................................ 708/209, 205; 377/64, 73, 81

(56) References Cited

U.S. PATENT DOCUMENTS

| | | | | |
|---|---|---|---|---|
| 4,141,005 A | * | 2/1979 | Bonner et al. | 341/60 |
| 5,477,543 A | | 12/1995 | Purcell | |
| 5,553,010 A | * | 9/1996 | Tanihira et al. | 708/209 |
| 5,844,828 A | * | 12/1998 | Fujimura et al. | 708/209 |
| 5,978,822 A | * | 11/1999 | Muwafi et al. | 708/209 |

* cited by examiner

Primary Examiner—Chuong Dinh Ngo
(74) Attorney, Agent, or Firm—Vedder, Price, Kaufman & Kammholz, P.C.

(57) ABSTRACT

A method and apparatus for arithmetic shifting includes processing that begins by receiving a decoded instruction in a cycle of a pipeline process. Also during this cycle of the pipeline process, shift information and a data operand are determined based on the decoded instruction. In a subsequent cycle of the pipeline process, a data output is generated from the data operand based on the shift information using a crossbar shifting function.

18 Claims, 5 Drawing Sheets

METHOD AND APPARATUS FOR ARITHMETIC SHIFTING

TECHNICAL FIELD OF THE INVENTION

This invention relates generally to processors and more particularly to an arithmetic shifter contained within such processors.

BACKGROUND OF THE INVENTION

Computers are known to include a central processing unit (CPU), system memory video graphics processing circuitry, audio processing circuitry, modems, and input/output (I/O) ports. The I/O ports allow the central processing unit to interface with peripheral devices such as monitors, keyboards, mouses, printers, the Internet, a local area network, etc. The central processing unit processes applications, which are stored in system memory, in accordance with user inputs to achieve a desired result.

To process the applications, the central processing unit includes circuitry to receive and decode instructions and circuitry to process data in accordance with the decoded instructions. The circuitry to process the data typically includes an arithmetic logic unit (ALU). The arithmetic logic unit performs arithmetic functions such as add, subtract, multiply, divide, shift data, etc. and performs logic functions such as AND, OR, NAND, NOR, exclusive OR, etc.

To achieve the data shift function, the arithmetic logic unit includes an arithmetic shifter. One such arithmetic shifter is disclosed in U.S. Pat. No. 5,477,543. The '543 patent teaches a shifter that simultaneously and independently shifts and records a plurality of data bytes. Such a shifter includes first and second registers that each receives a plurality of data bytes. The first register is coupled to a plurality of first buses, with each of the first buses receiving a data byte from the first register. Similarly, the second register is coupled to a plurality of second buses, with each of the second buses receiving a data byte from the second register. A multiplicity of third buses are coupled to the first and second buses. A byte shifting multiplexor is coupled to each of the third buses. A plurality of bit shifting multiplexors are coupled to the byte shifting multiplexors, with each bit shifting multiplexor being coupled to a pair of byte shifting multiplexors. A control circuit is coupled to the byte shifting and bit shifting multiplexors. A control circuit is coupled to the byte shifting and bit shifting multiplexor. The control circuit provides for independent control of each of the byte shifting multiplexors. The control circuit also provides for independent control of each of the bits shifting multiplexors.

The shifter of the '543 patent efficiently produces shifted values, but could be enhanced to provide further functionalities by at least preprocessing data before it is received by the shifter.

DETAILED DESCRIPTION OF A PREFERRED EMBODIMENT

Generally, the present invention provides a method and apparatus for arithmetic shifting. Such a method and apparatus includes processing that begins by receiving a decoded instruction in a cycle of a pipeline process. Also during this cycle of the pipeline process, shift information and a data operand are determined based on the decoded instruction. In a subsequent cycle of the pipeline process, a data output is generated from the data operand based on the shift information using a crossbar shifting function. By splitting the arithmetic shifting into two cycles of a pipeline process, the first cycle can be used to preprocess the data when needed and the second cycle is used to generate a resulting output from the preprocessed data. With such a method and apparatus, an arithmetic shifter having enhanced functionality is realized.

Figure 1:
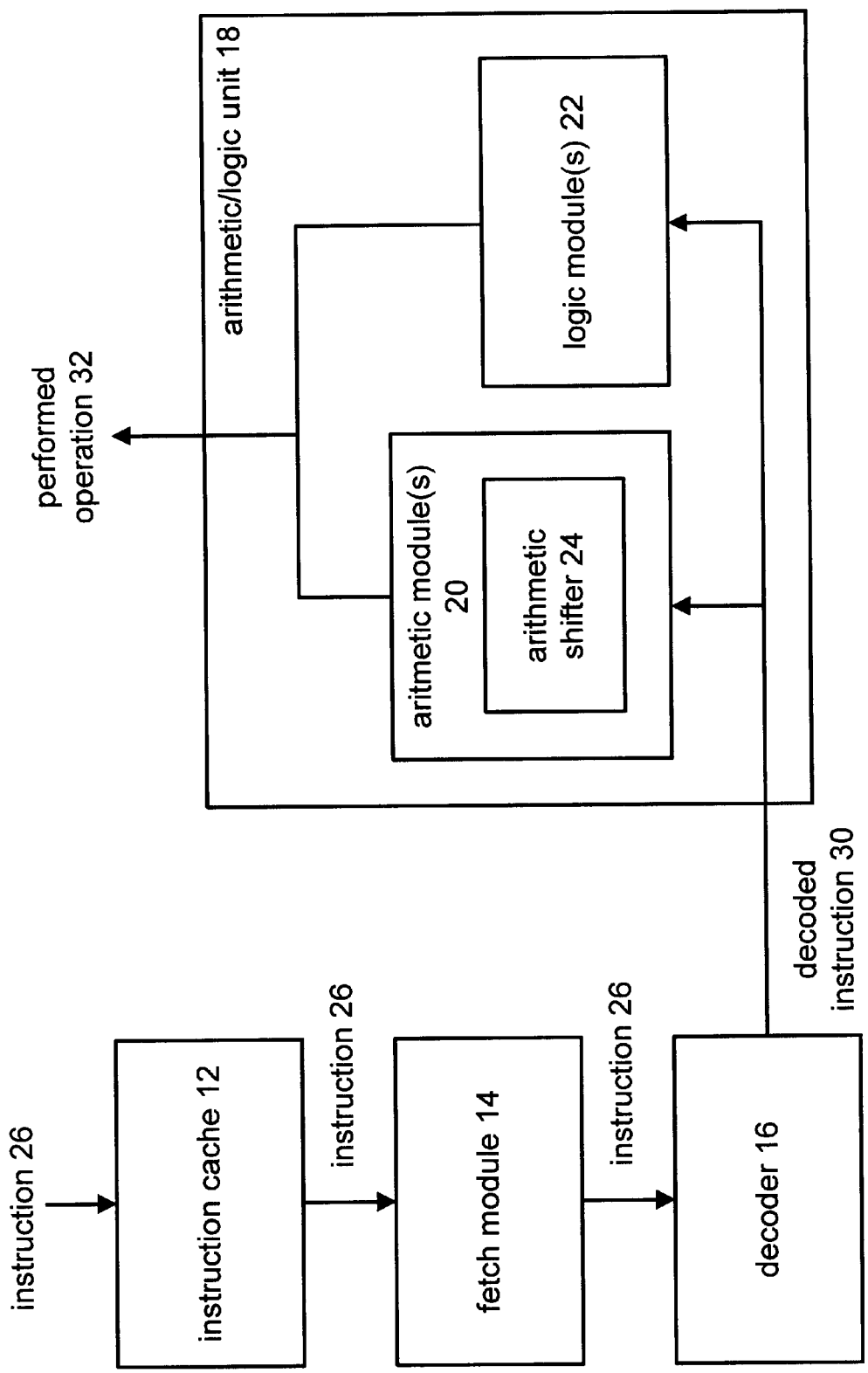
FIG. 1 illustrates a schematic block diagram of a central processing unit, or processor, in accordance with the present invention.

The present invention can be more fully described with reference to FIGS. 1 through 6. FIG. 1 illustrates a schematic block diagram of a processor 10 that includes an instruction cache 12, a fetch module 14, a decoder 16, and an arithmetic/logic unit 18. The arithmetic logic unit 18 includes at least one arithmetic module 20 and at least one logic module 22. Each of the arithmetic modules 20 includes an arithmetic shifter 24. The arithmetic shifter 24 may be implemented using a processing module and memory. The processing module may be a single processing device or a plurality of processing devices. Such processing device may be a microprocessor, microcontroller, microcomputer, digital signal processor, logic circuitry, state machine, and/or any other device that manipulates signals (analog and/or digital) based on operational instructions. The memory may be a single memory device or a plurality of memory devices. Such a memory device may be a random access memory, a read only memory, floppy disk memory, magnetic tape memory, and/or any device that stores digital information. Note that when the processing module implements one or more of its functions via a state machine and/or logic circuitry, the memory storing the corresponding operational instructions is embedded within the circuitry comprising the state machine and/or logic circuitry.

In operation, the instruction cache 12 is operably coupled to receive instructions 26 and store them. The fetching module 14 is operably coupled to retrieve the instructions 26 from the instruction cache 12 and provide them to the decoder 16. The decoder 16 decodes the instruction 26 to produce a decoded instruction 30. In essence, the decoder 16 converts instructions into microcode. The decoded instruction 30 is then provided to the arithmetic module 20 and the A logic module 22. In accordance with the decoded instruction, the arithmetic module 20 and/or the logic module 22 produce a performed operation 32. For example, if the instruction were to add two numbers, the arithmetic module 20 would perform a mathematical function of addition to produce the performed operation 32. As a further example, if the instruction indicated the performance of an exclusive OR on two data elements, the logic module 22 would perform the exclusive OR function to produce the performed operation on 32.

Figure 2:
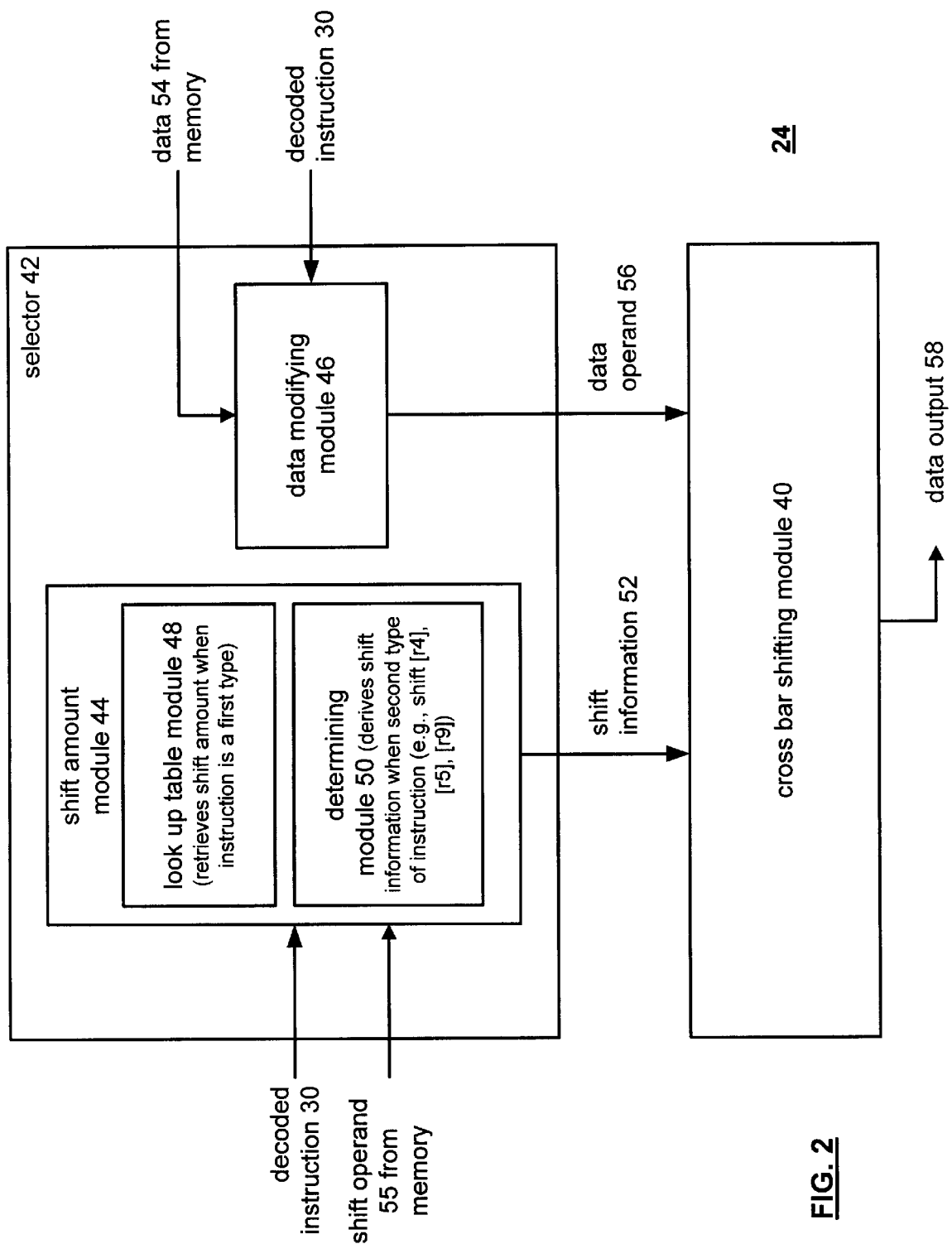
FIG. 2 illustrates a schematic block diagram of an arithmetic shifter in accordance with the present invention.

FIG. 2 illustrates a schematic block diagram of the arithmetic shifter 24. The arithmetic shifter 24 includes a selector 42 and a crossbar shifting module 40. The selector 42 includes a shift amount module 44 and a data modifying module 46. The shift amount module 44 includes a look up table module 48 and a determining module 50. The selector 42 is operably coupled to receive the decoded instruction 30 in both of the shift amount module 44 and the data modifying module 46.

The shift amount module 44 is operably coupled to produce shift information 52 from the decoded instruction 30 and from a shift amount 55, which is received from memory and indicates the amount the data is to be shifted. Depending on the type of instruction 30, the shift amount module 44 will use the look-up table module 48 or the determining module 50. If the decoded instruction 30 is of a first type, the look-up table module 48 is utilized. For this type of instruction, the instruction will include an indication that the shift amount information is to be retrieved from a look-up table. If the decoded instruction 30 is of a second type, the determining module 50 will be utilized. The determining module is operable to determine the shift information based on the decode instruction. For example, the decoded instruction may indicate a shift R4, R5, R9 operation. Such an instruction code indicates that the value found in register 4 is to be shifted by the value found in register 5 and the resulting shifted value is to be stored in register 9. As such, the determining module 50 determines the particular shift information 52 by interpreting the decoded instruction. In particular, for this example, the determining module 50 reads the information in register 5 to produce the shifting information 52.

The shift information 52 includes a byte select vector and a bit select vector. For a right shift operation, the shift amount module 44 produces a pair of four-bit select values, which is replicated for each of a plurality of byte multiplexors. The byte multiplexors and subsequent functionality of the crossbar module will be discussed in greater detail with references to FIGS. 3 through 5. In addition, the shift amount module generates a bit shift vector that is four bits in length and replicates it for each of a plurality of bit multiplexors. For a left shift operation, the shift amount module prepares the three bits for the bit shift vector and byte shift vector as if it were preparing a right shift and then inverts the three bits and adds one to create a negative count. As one of average skill in the art will appreciate, a left shift amount is equivalent to, for 128 bit word, 128 minus the shift amount when performed as a right shift function.

The data modifying module 46 is operably coupled to receive the decoded instruction 30 and to process data 54 that is retrieved from memory. The data modifying module 46 interprets the data to determine whether it is saturated, i.e., does it equal a maximum positive value or a maximum negative value. If so, the data modifying module 46 clamps the data to a maximum positive value or maximum negative value.

The data modifying module 46 also performs sign extensions. For example, depending on the size of the data words being operated upon, sign extensions may be used. For example, if the arithmetic shifter 24 is capable of processing 64 or 128 bit words, and the current data is only 8 bits, the remaining 56 or 120 bits need to be filled. In a signed extension scheme, the remaining bits are filled with the value of the most significant bit of the data, i.e., the sign bit. In addition, if the data is packed data, the data modifying module 46 ensures that the resultant data operand 56 is provided to corresponding sections of the crossbar shifting module 40 such that each individual data element of the packed data is treated independently.

The data modifying module 46 also produces crossbar left data and crossbar right data patterns. The following table illustrates various crossbar left data and crossbar right data patterns based on a byte select vector.

TABLE

| Sel | Left output | | | | | | | | Right output | | | | | | | |
|---|---|---|---|---|---|---|---|---|---|---|---|---|---|---|---|---|
|  | 7 | 6 | 5 | 4 | 3 | 2 | 1 | 0 | 7 | 6 | 5 | 4 | 3 | 2 | 1 | 0 |
| 0  | B8 | B7 | B6 | B5 | B4 | B3 | B2 | B1 | B7 | B6 | B5 | B4 | B3 | B2 | B1 | B0 |
| 1  | B9 | B8 | B7 | B6 | B5 | B4 | B3 | B2 | B8 | B7 | B6 | B5 | B4 | B3 | B2 | B1 |
| 2  | BA | B9 | B8 | B7 | B6 | B5 | B4 | B3 | B9 | B8 | B7 | B6 | B5 | B4 | B3 | B2 |
| 3  | BB | BA | B9 | B8 | B7 | B6 | B5 | B4 | BA | B9 | B8 | B7 | B6 | B5 | B4 | B3 |
| 4  | BC | BB | BA | B9 | B8 | B7 | B6 | B5 | BB | BA | B9 | B8 | B7 | B6 | B5 | B4 |
| 5  | BD | BC | BB | BA | B9 | B8 | B7 | B6 | BC | BB | BA | B9 | B8 | B7 | B6 | B5 |
| 6  | BE | BD | BC | BB | BA | B9 | B8 | B7 | BD | BC | BB | BA | B9 | B8 | B7 | B6 |
| 7  | BF | BE | BD | BC | BB | BA | B9 | B8 | BE | BD | BC | BB | BA | B9 | B8 | B7 |
| 8  | B0 | BF | BE | BD | BC | BB | BA | B9 | BF | BE | BD | BC | BB | BA | B9 | B8 |
| 9  | B1 | B0 | BF | BE | BD | BC | BB | BA | B0 | BF | BE | BD | BC | BB | BA | B9 |
| 10 | B2 | B1 | B0 | BF | BE | BD | BC | BB | B1 | B0 | BF | BE | BD | BC | BB | BA |
| 11 | B3 | B2 | B1 | B0 | BF | BE | BD | BC | B2 | B1 | B0 | BF | BE | BD | BC | BB |
| 12 | B4 | B3 | B2 | B1 | B0 | BF | BE | BD | B3 | B2 | B1 | B0 | BF | BE | BD | BC |
| 13 | B5 | B4 | B3 | B2 | B1 | B0 | BF | BE | B4 | B3 | B2 | B1 | B0 | BF | BE | BD |
| 14 | B6 | B5 | B4 | B3 | B2 | B1 | B0 | BF | B5 | B4 | B3 | B2 | B1 | B0 | BF | BE |
| 15 | B7 | B6 | B5 | B4 | B3 | B2 | B1 | B0 | B6 | B5 | B4 | B3 | B2 | B1 | B0 | BF |

The crossbar shifting module 40 is operably coupled to receive the shift information 52 and the data operand 56. Based on these inputs, the crossbar shifting module 40 produces a data output 58. The details of crossbar shifting module 40 will be discussed in greater detail with reference to FIGS. 3 through 5.

Figure 3:
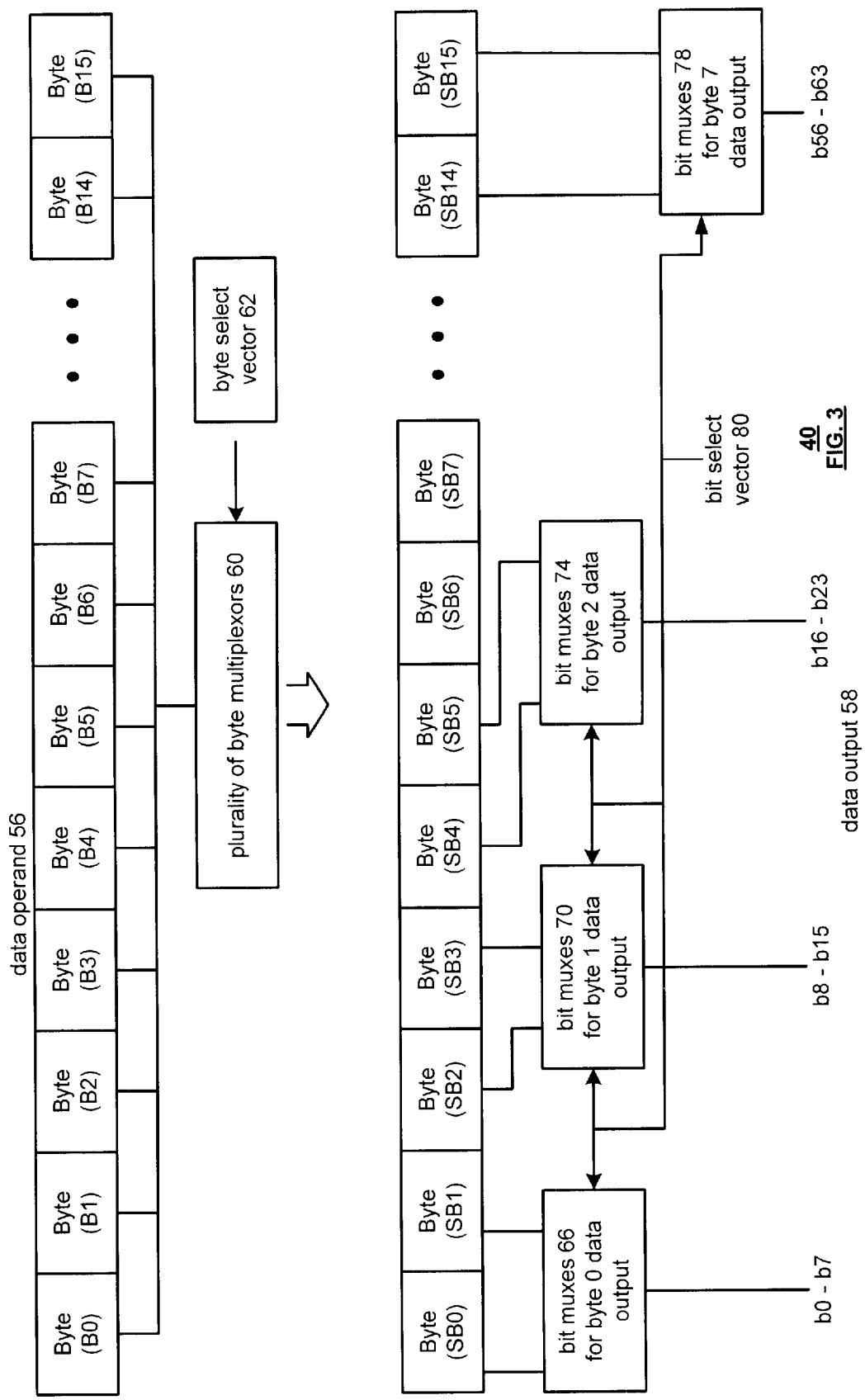
FIG. 3 illustrates a schematic block diagram of a crossbar shifting module in accordance with the present invention.

FIG. 3 illustrates a schematic block diagram of the crossbar shifting module 40. The crossbar shifting module 40 includes a plurality of byte multiplexors 60 and a plurality of bit multiplexors 66 through 78. The plurality of byte multiplexors 60 are operably coupled to receive the data operand 56 in accordance with the preceding table based on the byte select vector. The data operand 56 is shown to include 16 bytes, i.e., the data operand is a 128 bit word. The plurality of byte multiplexors 60 includes 16 multiplexors each operably coupled to receive the bytes of the data operand. Based on a byte select vector 62, the plurality of byte multiplexors 60 produces selected bytes 64. With each of the plurality of byte multiplexors having each byte of the data operand as an input, any one of the multiplexors may output any one of the bytes. As such, any one of the bytes of the data operand may map to the first byte 0 of the selected bytes 64. Note that once a particular byte has been mapped to the byte 0 position of the selected bytes 64, the pattern of the data operand 56 will follow accordingly for the same byte select value for example, if the byte select vector 62 maps byte 3 of data operand 56 to byte 0 of the selected bytes 64, byte 4 of data operand 56 will map to byte 1 of the selected bytes 64, byte 5 of data operand 56 will map to byte 2 of selected byte 64, etc. The mapping will wrap-around such that byte 2 of data operand 56 maps to byte 15 of the selected bytes 64.

The bytes of the selected bytes are provided to the plurality of bit multiplexors 66, 70, 74, and 78. Each of the bit multiplexors 66, 70, 74, and 78 includes a plurality of multiplexors. In this arrangement, bit multiplexors 66 correspond to the first byte of the output data. as such, 8 multiplexors are included in bit multiplexors 66. Each of the multiplexors comprising bit multiplexor 66 receives the 16 bits from byte 0 and byte 1 of the selected bytes 64. Based on a bit select vector 80, each of the multiplexors comprising bit multiplexor 66 will output a single bit to produce b0 through b7 for byte 0 of data output 58. Bit multiplexors 70 produce the 8 bits for byte 1 of the data output based on byte 2 and byte 3 of the selected bytes 64. Accordingly, each byte of the data output 58 is produced by a plurality of bit multiplexors based on the bit select vector 80. Note that the plurality of bit multiplexors 78 for byte 7 of the data output utilize byte 14 and byte 15 of the selected bytes 64.

Figure 4:
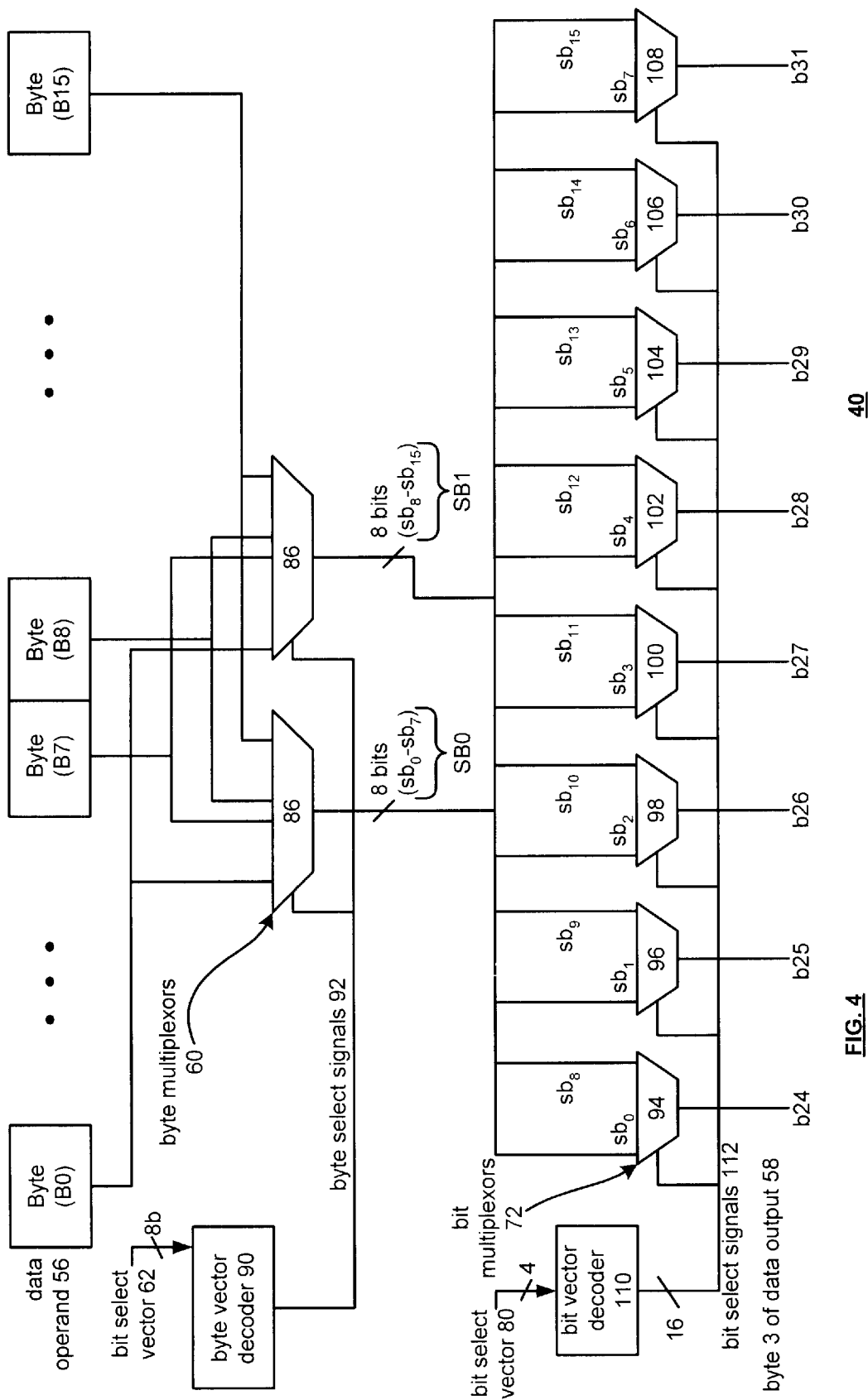
FIG. 4 illustrates a more detailed schematic block diagram of a portion of the crossbar shifting module in accordance with the present invention.

FIG. 4 illustrates a more detailed schematic block diagram of a portion of the crossbar shifting module 40. The byte multiplexors 60 include a plurality of multiplexors, wherein the number of byte multiplexors corresponds to the number of bytes in the data operand 56. As shown, a pair of byte multiplexors 84 and 86 are coupled to byte 7 and 8 of the data operand 56 and provides a representative operation of other pairs of byte multiplexors. Accordingly, there is a pair of multiplexors for bytes 6 and 9 of the data operand 56, a pair for bytes 5 and 10, a pair for bytes 4 and 11, a pair for bytes 3 and 12, a pair for bytes 2 and 13, a pair for bytes 1 and 14, and a pair for bytes 9 and 15. Each of the byte multiplexors 84 and 86 outputs an 8 bit value which corresponds to one of the bytes of the operand 56. The particular byte outputted is based on a byte select signal 92. A byte vector decoder 90 is operably coupled to receive the byte select vector 62 and produce the byte select signals 92. Each of the byte multiplexors 60 will receive an individual byte select signal to output the appropriate byte.

The bit multiplexors 72, which corresponds to byte 3 of the data output 58 is shown to include a plurality of bit multiplexors 94 through 108. Each of the bit multiplexors receives two bytes of information ($sb_0$–$sb_7$ and $sb_8$–$sb_{15}$) from the corresponding pair of multiplexors 84 and 86. As shown, the inputs to multiplexors 94 through 108 are received from byte multiplexors 84 and 86, where multiplexor 94 receives $sb_0$–$sb_8$, multiplexor 96 receives $sb_1$–$sb_9$, multiplexor 98 receives $sb_2$–$sb_{10}$, multiplexor 100 receives $sb_3$–$sb_{11}$, multiplexor 102 receives $sb_4$–$sb_{12}$, multiplexor 104 receives $sb_5$–$sb_{13}$, multiplexor 106 receives $sb_6$–$sb_{14}$, and multiplexor 108 receives $sb_7$–$sb_{15}$. Each of the bit multiplexor 94 through 108 output a single bit of byte 3 of the output data 58. The particular bit outputted by the corresponding multiplexor is based on a corresponding one of the bit select signals 112.

The bit select signals 112 are produced by a vector decoder 1 10 based on the bit select vector 80. For example, when the bit select signals 112 are "0000", the bit multiplexors 94–108 will output a bit pattern of $sb_0$, $sb_1$, $sb_2$, . . . $sb_7$. When the bit select signals 112 are "0001", the bit multiplexors 94–108 output a bit pattern of $sb_1$, $sb_2$, . . . $sb_7$, $sb_0$. When the bit select signals 112 are "0010", the bit multiplexors 94–108 output a bit pattern of $sb_2$, $sb_3$, . . . $sb_7$, $sb_8$, $sb_9$. When the bit select signals 112 are "0011", the bit multiplexors 94–108 output a bit pattern of $sb_3$, $sb_4$, $sb_5$, $sb_6$, $sb_7$, $sb_8$, $sb_9$, $sb_{10}$. When the bit select signals 112 are "0100", the bit multiplexors 94–108 output a bit pattern of $sb_4$, $sb_5$, $sb_6$, $sb_7$, $sb_8$, $sb_9$, $sb_{10}$, $sb_{11}$. When the bit select signals 112 are the bit multiplexors 94–108 output a bit pattern of $sb_5$, $sb_6$, $sb_7$, $sb_8$, $sb_9$, $sb_{10}$, $sb_{11}$, $sb_{12}$. When the bit select signals 112 are "0110", the bit multiplexors 94–108 output a bit pattern of $sb_6$, $sb_7$, $sb_8$, $sb_9$, $sb_{10}$, $sb_{11}$, $sb_{12}$, $sb_{13}$. When the bit select signals 112 are "0111", the bit multiplexors 94–108 output a bit pattern of $sb_7$, $sb_8$, $sb_9$, $sb_{10}$, $sb_{11}$, $sb_{13}$, $sb_{14}$. And when the bit select signal 112 are "1000", which corresponds to the maximum shift value, the bit multiplexors 94–108 output a bit pattern of $sb_8$, $sb_9$, $sb_{10}$, $sb_{11}$, $sb_{12}$, $sb_{13}$, $sb_{14}$, $sb_{15}$. When the bit select signal 112 falls in a range of "1001" to "1111", the multiplexors selects non-shift data values, such as constant zeros or constant ones.

Figure 5:
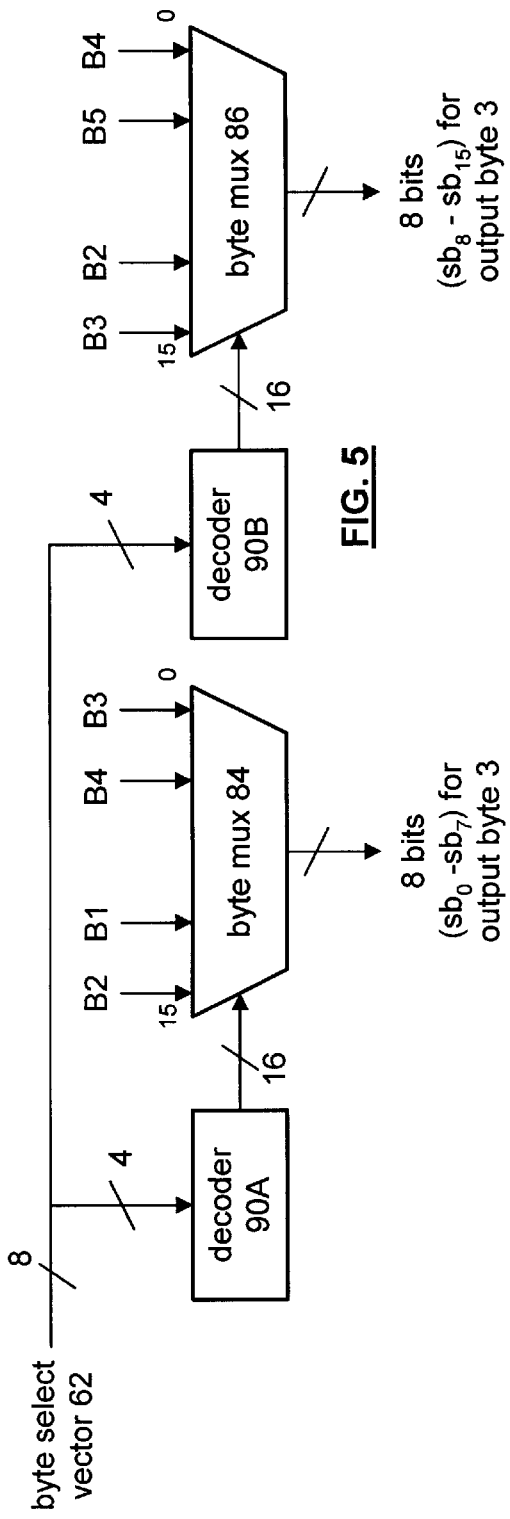
FIG. 5 illustrates a schematic block diagram of a pair of byte multiplexors in accordance with the present invention.

FIG. 5 illustrates a schematic block diagram of the byte multiplexors 84 and 86 operably coupled to individual decoders 90A and 90B of the byte vector decoder 90. As shown, the byte select vector 62 includes eight bits of information, four of which are provided to decoder 90A and the remaining four are provided to decoder 90B. Note that the byte select vector 62 may be a unique vector for each pair of the byte multiplexors or it may be the same vector for each pair of the byte multiplexors. Further note that the other pairs of multiplexors functions in a similar manner as byte multiplexors 84 and 86.

The decoder 90A decodes the four bits of the byte select vector 62 to product a sixteen bit value that is provided to byte multiplexor 84. Similarly, decoder 90B decodes the four bits of the byte select vector 62 to product a sixteen-bit value that is provided to byte multiplexor 86. The byte multiplexors 84 and 86 each output one of the bytes (B0–B15) of the data operand 56 based on the value of their sixteen-bit input. The following table is an example of the various outputs of byte multiplexor 84 and 86 based on the sixteen-bit input. As shown in the first entry of the table, when the sixteen-bit value is 0000 0000 0000 0000, byte multiplexor 84 outputs byte 3 (B3), which is the byte coupled to the first input (i.e., position "0") of the byte multiplexor 84. For the same sixteen-bit value, byte multiplexor 86 outputs byte 4 (B4). Accordingly, the byte outputted by the respective byte multiplexor 84 or 86 is dependent on its input position with respect to the byte multiplexor.

| sixteen-bit value | multiplexor 84 output | multiplexor 86 output |
| --- | --- | --- |
| 0000 0000 0000 0000 | byte 3 (B3) | byte 4 (B4) |
| 0000 0000 0000 0010 | byte 4 (B4) | byte 5 (B5) |
| 0000 0000 0000 0100 | byte 5 (B5) | byte 6 (B6) |
| 0000 0000 0000 1000 | byte 6 (B6) | byte 7 (B7) |
| 0000 0000 0001 0000 | byte 7 (B7) | byte 8 (B8) |
| 0000 0000 0010 0000 | byte 8 (B8) | byte 9 (B9) |
| 0000 0000 0100 0000 | byte 9 (B9) | byte 10 (B10) |
| 0000 0000 1000 0000 | byte 10 (B10) | byte 11 (B11) |
| 0000 0001 0000 0000 | byte 11 (B11) | byte 12 (B12) |
| 0000 0010 0000 0000 | byte 12 (B12) | byte 13 (B13) |

-continued

| sixteen-bit value | multiplexor 84 output | multiplexor 86 output |
|---|---|---|
| 0000 0100 0000 0000 | byte 13 (B13) | byte 14 (B14) |
| 0000 1000 0000 0000 | byte 14 (B14) | byte 15 (B15) |
| 0001 0000 0000 0000 | byte 15 (B15) | byte 0 (B0) |
| 0010 0000 0000 0000 | byte 0 (B0) | byte 1 (B1) |
| 0100 0000 0000 0000 | byte 1 (B1) | byte 2 (B2) |
| 1000 0000 0000 0000 | byte 2 (B2) | byte 3 (B3) |

Figure 6:
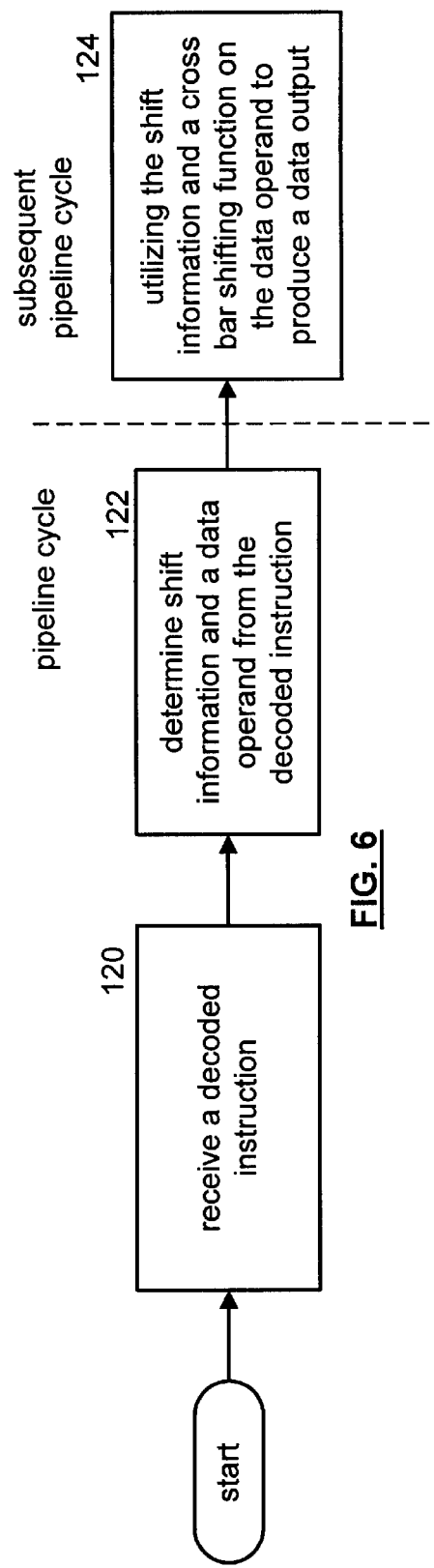
FIG. 6 illustrates a logic diagram of a method for arithmetic shifting in accordance with the present invention.

FIG. 6 illustrates a logic diagram of a method for arithmetic shifting. The process begins at step 120 where a decoded instruction is received. The process then proceeds to step 122 where shift information and a data operand are determined from the decoded instruction. Steps 120 and 122 occur during a cycle of a pipeline process. The determination of the data operand may further include modifying the data identified in the decoded instruction based on at least one of the type of instruction, size of the data operand and/or saturation. The size of the operand indicates whether a sign extension for the particular data operand is required. In addition, the type of instruction may indicate shift, rotate, direction, with or without carry, arithmetic shifts or logical shifts, and whether the data is packed or unpacked.

The shift information may be generated based on the type of instruction contained in the decoded instruction. For example, when the decoded instruction is of a first type, the shift information is retrieved from a look up table and when the decoded instruction is of a second type it is generated based on a shift amount operand contained within the decoded instruction.

The process then proceeds to step 124 where the shift information and a crossbar shifting function are utilized upon the data operand to produce a data output. The shift information includes a byte select vector and a bit select vector. The byte select vector is provided to a plurality of byte multiplexors and the bit select vector is provided to a plurality of bit multiplexors. The plurality of bit and byte multiplexors generate the output data in accordance with the shift information, i.e., the byte select vector and the bit select vector. Step 124 occurs in a subsequent pipeline cycle to that of steps 120 and 122. As such, by splitting the functionality in two pipeline cycles, the data may be preprocessed in the preceding cycle before undergoing a shift function in a subsequent cycle. As such, a crossbar shifting function may be enhanced with the application of the present invention. As one of average skill in the art would readily appreciate, other embodiments may be derived from the teachings of the present invention without deviating from the scope of the claims.

What is claimed is:

1. An arithmetic shifter comprises:
a cross bar shifting module operably coupled to receive a data operand and shift information, wherein the cross bar shifting module, in a given cycle of a pipeline, generates a data output from the data operand based on the shift information;
a selector operably coupled to the cross bar shifting module, wherein the selector provides the data operand and the shift information to the cross bar shifting module;
wherein the selector further comprises a data modifying module operably coupled to modify data identified in the decoded instruction based on type of instruction, size of data operand, and saturation; and
wherein the selector determines, in a cycle preceding the given cycle, the shift information and the data operand based on a decoded instruction.

2. The arithmetic shifter of claim 1, wherein the selector further comprises:
a shift amount module operably coupled to generate the shift information based on type of instruction contained in the decoded instruction.

3. The arithmetic shifter of claim 2, wherein the shift amount module further comprises:
a look up table module that retrieves the shift information from a look up table when the decoded instruction is of a first type of instruction; and
a determining module that generates the shift information based on a shift amount operand contained in the decoded instruction when the decoded instruction is of a second type of instruction.

4. The arithmetic shifter of claim 1, wherein the shift information further comprises a byte select vector and a bit select vector.

5. The arithmetic shifter of claim 4, wherein the cross bar shifting module further comprises a plurality of byte multiplexors and a plurality of bit multiplexors, wherein the plurality of byte multiplexors receive the byte select vector and the plurality of bit multiplexors receive the bit select vector, wherein the plurality of bit multiplexors and the plurality of byte multiplexors generate the data output in accordance with the shift information.

6. The arithmetic shifter of claim 5, wherein the cross bar shifting module further comprises:
a bit select vector decoder operably coupled to the plurality of bit multiplexors, wherein the bit select vector interprets the bit select vector and provides bit select signals to each of the plurality of bit multiplexors; and
a byte select vector decoder operably coupled to the plurality of byte multiplexors, wherein the byte select vector interprets the byte select vector and provides byte select signals to each of the plurality of byte multiplexors.

7. A method for arithmetic shifting, the method comprises the steps of:
in a cycle of a pipeline:
receiving a decoded instruction;
modifying data identified in the decoded instruction based on type of instruction, size of data operand, and saturation;
determining shift information and a data operand based on the decoded instruction; and
in a subsequent cycle of the pipeline:
generating a data output from the data operand based on the shift information using a cross bar shifting function.

8. The method of claim 7 further comprises:
generating the shift information based on type of instruction contained in the decoded instruction.

9. The method of claim 8 further comprises:
retrieving the shift information from a look up table when the decoded instruction is of a first type of instruction; and
generating the shift information based on a shift amount operand contained in the decoded instruction when the decoded instruction is of a second type of instruction.

10. The method of claim 7, wherein the shift information further comprises a byte select vector and a bit select vector.

11. The method of claim 10 further comprises:
providing the byte select vector to a plurality of byte multiplexors;
providing the bit select vector to a plurality of bit multiplexors; and generating the data output in accordance with the shift information by the plurality of bit multiplexors and the plurality of byte multiplexors.

12. The method of claim 11 further comprises:

interpreting the bit select vector to provide bit select signals to each of the plurality of bit multiplexors; and interpreting the byte select vector to provide byte select signals to each of the plurality of byte multiplexors.

13. An arithmetic shifter comprises:

a processing module; and memory operably coupled to the processing module, wherein the memory stores operational instructions that cause the processing module to:
in a cycle of a pipeline:
decode an instruction to produce a decoded instruction;
modify data identified in the decoded instruction based on type of instruction, size of data operand, and saturation;
determine shift information and a data operand based on the decoded instruction; and
in a subsequent cycle of the pipeline:
generate a data output from the data operand based on the shift information using a cross bar shifting function.

14. The arithmetic shifter of claim 13, wherein the memory further comprises operational instructions that cause the processing module to:

generate the shift information based on type of instruction contained in the decoded instruction.

15. The arithmetic shifter of claim 14, wherein the memory further comprises operational instructions that cause the processing module to:

retrieve the shift information from a look up table when the decoded instruction is of a first type of instruction; and generate the shift information based on a shift amount operand contained in the decoded instruction when the decoded instruction is of a second type of instruction.

16. The arithmetic shifter of claim 13, wherein the shift information further comprises a byte select vector and a bit select vector.

17. The arithmetic shifter of claim 16, wherein the memory further comprises operational instructions that cause the processing module to:

provide the byte select vector to a plurality of byte multiplexors;

provide the bit select vector to a plurality of bit multiplexors; and generate the data output in accordance with the shift information by the plurality of bit multiplexors and the plurality of byte multiplexors.

18. The arithmetic shifter of claim 17, wherein the memory further comprises operational instructions that cause the processing module to:

interpret the bit select vector to provide bit select signals to each of the plurality of bit multiplexors; and interpret the byte select vector to provide byte select signals to each of the plurality of byte multiplexors.

* * * * *